(12) United States Patent
Horie

(10) Patent No.: US 7,076,116 B2
(45) Date of Patent: Jul. 11, 2006

(54) IMAGE PROCESSING APPARATUS

(75) Inventor: Daisaku Horie, Uji (JP)

(73) Assignee: Minolta Co., Ltd., Osaka (JP)

(*) Notice: Subject to any disclaimer, the term of this patent is extended or adjusted under 35 U.S.C. 154(b) by 611 days.

(21) Appl. No.: 10/044,503

(22) Filed: Jan. 10, 2002

(65) Prior Publication Data
US 2003/0103683 A1 Jun. 5, 2003

(30) Foreign Application Priority Data
Jan. 12, 2001 (JP) .............................. 2001-005245

(51) Int. Cl.
*G06K 9/36* (2006.01)

(52) U.S. Cl. ...................... 382/284; 382/282; 382/294; 358/538; 358/450

(58) Field of Classification Search ................ 382/284, 382/294, 295, 219, 216, 220, 282; 358/540, 358/450, 538, 453; 348/584, 588; 345/629, 345/630, 635, 641
See application file for complete search history.

(56) References Cited

U.S. PATENT DOCUMENTS

| 5,465,163 | A | * | 11/1995 | Yoshihara et al. | .......... 358/444 |
| 5,469,274 | A | * | 11/1995 | Iwasaki et al. | ............. 358/450 |
| 5,585,936 | A | * | 12/1996 | Eto et al. | ..................... 358/450 |
| 5,602,584 | A | * | 2/1997 | Mitsutake et al. | ............ 348/47 |
| 5,838,837 | A | * | 11/1998 | Hirosawa et al. | ........... 382/284 |
| 6,067,153 | A | * | 5/2000 | Mizuno | ................... 356/237.2 |
| 6,128,416 | A | * | 10/2000 | Oura | .......................... 382/284 |
| 6,359,617 | B1 | * | 3/2002 | Xiong | ........................ 345/425 |
| 6,456,323 | B1 | * | 9/2002 | Mancuso et al. | ........ 348/218.1 |
| 6,549,681 | B1 | * | 4/2003 | Takiguchi et al. | .......... 382/294 |

FOREIGN PATENT DOCUMENTS

| JP | 06-195447 A | 7/1994 |
| JP | 09-330396 A | 12/1997 |

* cited by examiner

*Primary Examiner*—Samir Ahmed
*Assistant Examiner*—Yosef Kassa
(74) *Attorney, Agent, or Firm*—Sidley Austin LLP

(57) ABSTRACT

An image processing apparatus comprising image capturing means for capturing a plurality of images, adjacent ones of which partially overlap with each other, overlap region determining means for determining an overlap region, first region determining means for determining a first region within the overlap region determined, first pixel value determining means for determining a pixel value in the first region based on a pixel value of one of the two adjacent images, second pixel value determining means for determining a pixel value in a second region within the overlap region based on respective pixel values of the two adjacent images, and image joining means for joining the two adjacent images with each other by utilizing the determined pixel value in the first region and the determined pixel value in the second region as pixel values in respective regions of the overlap region.

13 Claims, 18 Drawing Sheets

Fig. 16
Fig. 17
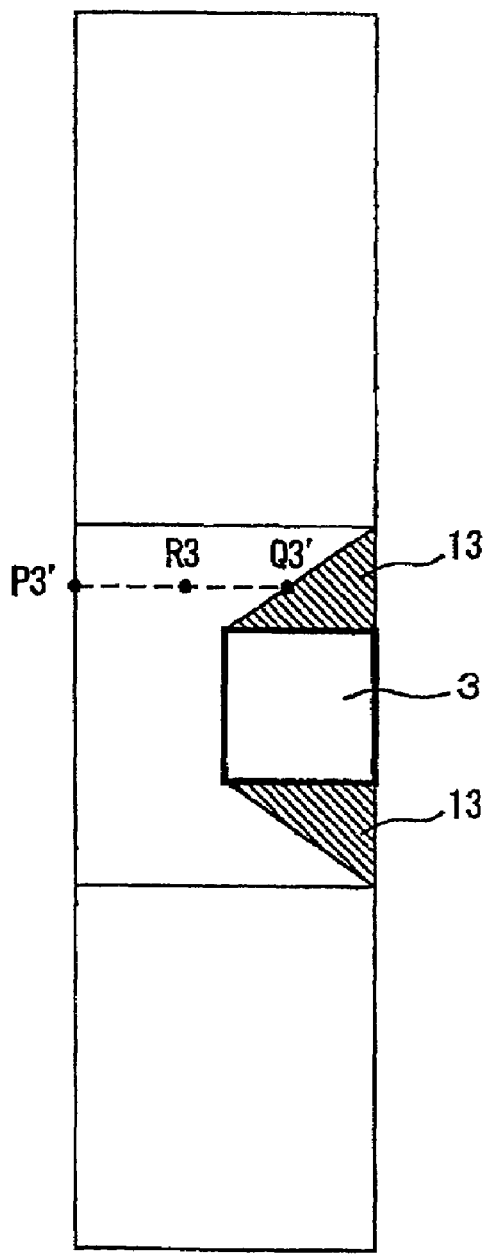
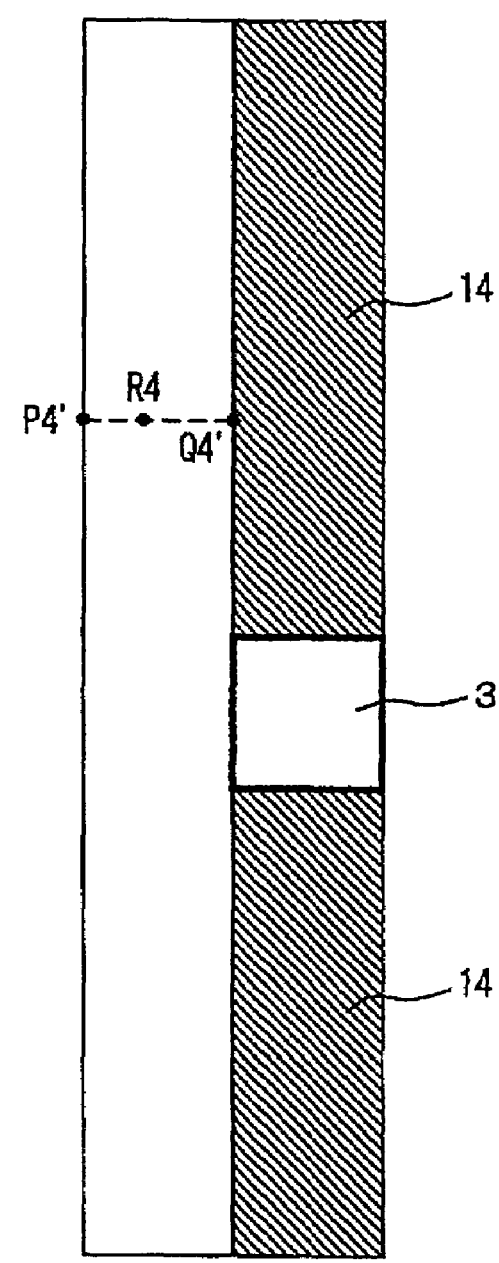

Fig. 20
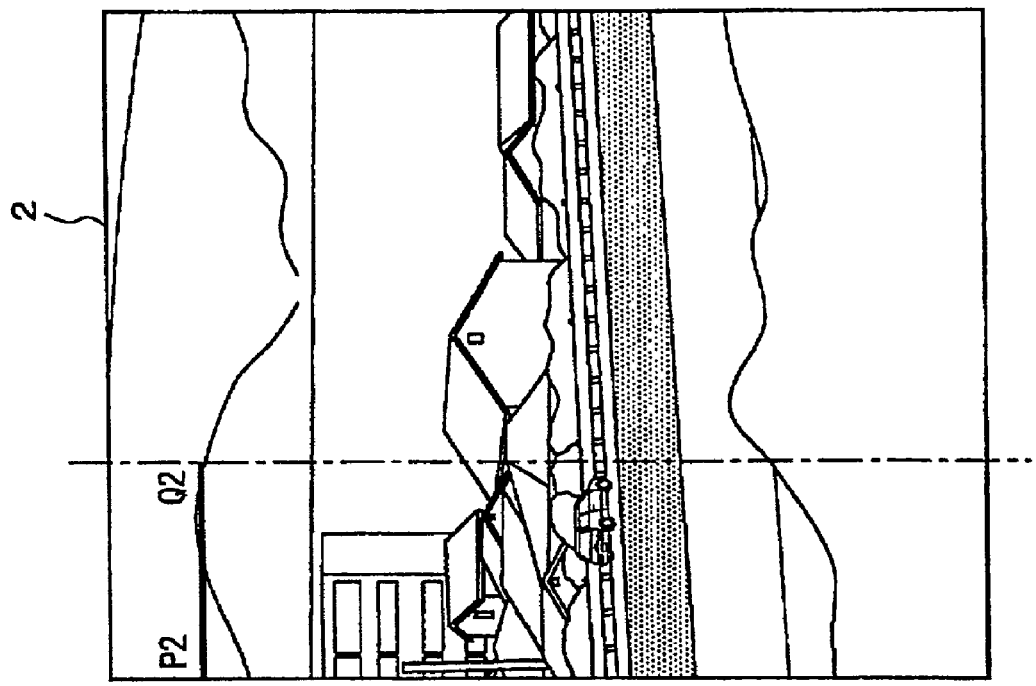
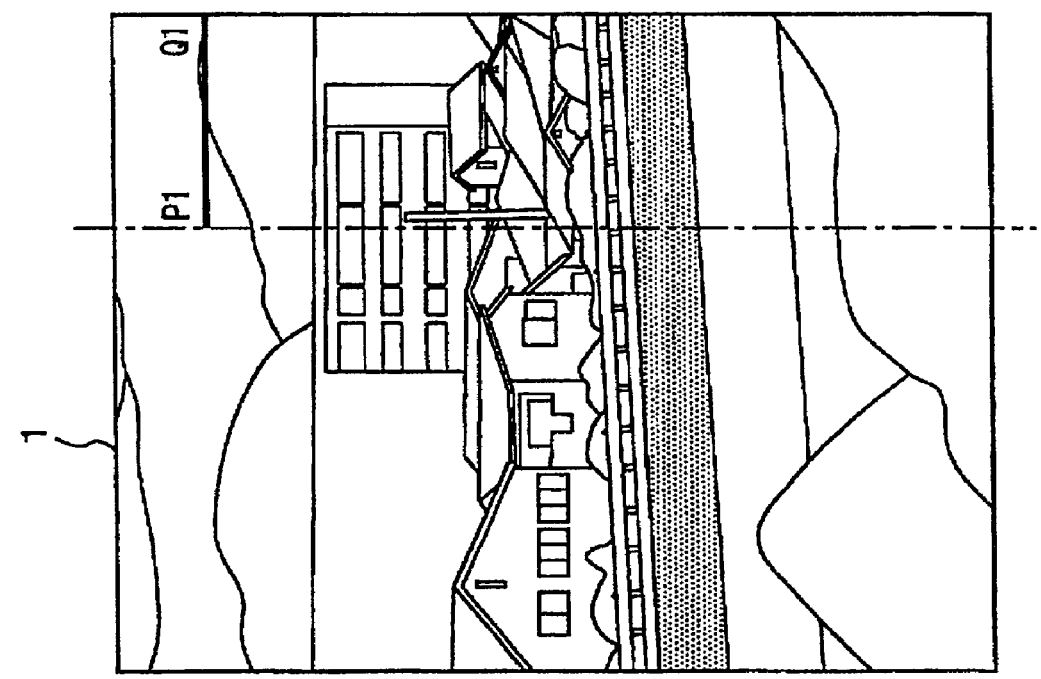

IMAGE PROCESSING APPARATUS

This application is based on application No. 2001-5245 filed in Japan, the content of which is hereby incorporated by reference.

FIELD OF THE INVENTION

The present invention relates to an image processing apparatus, an image processing method and image processing program which are capable of preventing image degradation in joining a plurality of images with each other to provide a single image even when there is a region where the contents of the images differ largely from each other. The invention also relates to a computer-readable recording medium storing the image processing program.

DESCRIPTION OF THE RELATED ART

As disclosed in the gazette of JP-A-9-330396, an image joining technique is known in which a plurality of images including a region where the images overlap with each other (hereinafter referred to as "overlap region") are joined to provide a single image. This technique is effectively utilized for joining a plurality of separately captured images to obtain an image of a larger number of pixels from an input device of an image capturing device of a limited number of pixels, or to obtain an image of a wide angle of view from an input device of an optical system of a limited angle of view.

Generally, in the plurality of images to be joined, respective pixel values of the images in the overlapping portion do not necessarily coincide with each other because of various geometric deformations such as lens distortion or exposure differences. Further, it is not possible to accurately superimpose the overlap regions also in the case where the matching accuracy of each image is poor. Therefore, when the image joining is performed just by putting the images together, a clear seam is formed at the boundary of the images, thereby making the resulting image unnatural.

Therefore, as a joining method which makes such a seam inconspicuous, weighted mean processing is employed in which respective pixel values at the overlapping portion are weighted in accordance with the position and averaged. By this processing, even when picture images in which the pixel values vary continuously are to be joined for example, it is possible to prevent the seam from becoming conspicuous at the boundary line.

The weighted mean processing will be briefly described below. FIG. 20 illustrates examples of two images to be joined together. In this case, the image joining is to be performed with respect to two right and left images. Hereinafter, the image 1 on the left is referred to as the left image, whereas the image 2 on the right is referred to as the right image. In this case, the overlap region for the left image is a region on the right side of a chain line, and the overlap region for the right image is a region on the left side of a chain line.

FIG. 21 illustrates the principle of weighted mean processing. The abscissa is the pixel position, whereas the ordinate is the pixel value at each pixel position. This graph shows a pixel value on the straight line P1Q1 in the overlap region of the left image and a pixel value on a straight line P2Q2 in the overlap region of the right image shown in FIG. 20.

The pixel positions P and Q shown in the graph correspond to P1, P2 and Q1, Q2 in FIG. 20, respectively. The curve 211 shows the variation of the pixel value of the left image along the line P1Q1, whereas the curve 212 shows the variation of the pixel value of the right image along the line P2Q2.

For example, when the pixel value after the image joining at a given pixel position R located between P and Q is represented by V(R), V(R) is found by:

$$V(R) = (\text{distance } PR \times V2(R) + \text{distance } QR \times V1(R))/(\text{distance } PQ)$$

where V1(R) is the pixel value of the left image at the position corresponding to the pixel position R, whereas V2(R) is the pixel value of the right image at the position corresponding to the pixel position R. Thus, the pixel value at each position between P and Q after the weighted mean processing is shown by the curve 210.

As shown in the graph, the curve 210 indicating the pixel value after the image joining coincides with the point of the curve 211 at the pixel position P, i.e., coincides with the pixel value at P1 of the left image. As the pixel position shifts from P to Q, the curve gradually deviates from the curve 211 to approach the curve 212, and finally coincides with the point of the curve 212 at the pixel position Q, i.e., coincides with the pixel value at Q2 of the right image.

In this way, according to the weighted means processing, average values obtained while changing the weight in accordance with the position is used for the pixel values in the overlap region after the image joining. Therefore, the pixel value variation between the images occurs continuously so that the image after the joining does not include conspicuous seam at the boundary of the images.

However, the image joining by such weighted mean processing has the following problems.

For forming a panoramic image, separate image capturing, i.e. capturing of a plurality of images at different timing are often performed. In such a case, a moving object may often be included in a part of the overlap region of the separate images.

For example, in FIG. 20, a car exists in the overlap region of the right image whereas no car exists at the corresponding position of the overlap region of the left image. This is because, the left image was captured after the capturing of the right image, and the car, which had existed in the overlap region in capturing the right image, passed and did not exist at the time of capturing the left image.

In this way, in the case where a overlap region include a region where the images differ largely from each other due to the existence of a moving object for example, the image joined utilizing the weighted mean processing becomes unnatural at the region and has a poor appearance.

FIG. 22 shows a composite image obtained by joining the two images shown in FIG. 20 using weighted mean processing. FIG. 23 illustrates the moving object existing region in the composite image of FIG. 22 as enlarged.

When the overlap regions of the two images shown in FIG. 20 are joined together by weighted mean processing, a natural image free from a conspicuous seam can be obtained, as shown in 22. However, as also shown in FIG. 20, at the region where a moving object i.e. the car exists in the overlap region, a blurred and awkward image is provided in which the car and the background look as if they are combined.

In this way, when a moving object exists in an overlap region to be joined, respective pixel values of the two images differ largely from each other at the overlap region, which causes a problem that the quality of the image obtained by joining the two images together is significantly degraded at that region.

SUMMARY OF THE INVENTION

It is an object of the present invention to provide an image processing apparatus, an image processing method and image processing program which are capable of joining two images together while preventing image degradation even when a region where the respective pixel values differ largely from each other exists within an overlap region of the two images, and to provide a computer-readable recording medium storing such an image processing program.

For achieving the object described above, an image processing apparatus according to the present invention comprises: image capturing means for capturing a plurality of images, adjacent ones of which partially overlap with each other; overlap region determining means for determining an overlap region where two adjacent ones of the images captured overlap with each other; first region determining means for determining a first region within the overlap region determined; first pixel value determining means for determining a pixel value in the first region based on a pixel value of one of the two adjacent images; second pixel value determining means for determining a pixel value in a second region within the overlap region based on respective pixel values of the two adjacent images, the second region being a region of the overlap region other than the first region; and image joining means for joining the two adjacent images with each other by utilizing the determined pixel value in the first region and the determined pixel value in the second region as pixel values in respective regions of the overlap region.

According to this invention, a first region is determined from the determined overlap region, and a pixel value in the first region is determined based on a pixel value of one of the two adjacent images. Therefore, even when the two images differ largely from each other in pixel value at a certain region due to the existence of a moving object for example, that region is determined as the first region and a pixel value in that region is determined based on a pixel value of either one of the two adjacent images. Therefore, it is possible to avoid such a situation that the image becomes unnatural and has a poor appearance at that region, which may occur if a pixel value in that region is determined based on respective pixel values of the both images.

Further, a pixel value in the second region, which is the overlap region other than the first region, is determined based on respective pixel values of the two adjacent images, so that a natural image including the characteristics of the both images can be provided.

Preferably, the first region determining means includes dividing means for dividing the overlap region into predetermined blocks, and comparing means for comparing the two images with respect to pixel values of the predetermined blocks, the first region being determined based on the result of the comparison by the comparing means.

Preferably, the comparing means includes judging means for judging whether or not the sum of absolute values of pixel value differences obtained on a predetermined block basis between the two images is equal to or greater than a threshold value, wherein, when the sum is judged to be equal to or greater than the threshold value, the first region determining means determines the relevant block as the first region.

Preferably, when the sum is judged to be smaller than the threshold value by the judging means, the first region determining means determines the relevant region as the first region if the relevant region meets a predetermined condition.

Preferably, the second pixel value determining means determines a pixel value by weighted mean processing related with a position.

Preferably, the first pixel value determining means includes judging means for judging which one of the two adjacent images is close to the determined first region when images are joined with each other, the image which is judged to be closer being utilized as one of the images, the pixel value in the first region being determined based on the pixel value of the one image.

Preferably, the first pixel value determining means includes contrast comparing means for comparing the two adjacent images with respect to a contrast of pixels in the determined first region, one of the images being determined based on a the result of comparison by the contrast comparing means, the pixel value in the first region being determined based on the pixel value of the one image.

Further, for achieving the object described above, an image processing method according to the present invention comprises: an image capturing step for capturing a plurality of images, adjacent ones of which partially overlap with each other; an overlap region determining step for determining an overlap region where two adjacent ones of the images captured overlap with each other; a first region determining step for determining a first region within the overlap region determined; a first pixel value determining step for determining a pixel value in the first region based on a pixel value of one of the two adjacent images; a second pixel value determining step for determining a pixel value in a second region within the overlap region based on respective pixel values of the two adjacent images, the second region being a region of the overlap region other than the first region; and an image joining step for joining the two adjacent images with each other by utilizing the determined pixel value in the first region and the predetermined pixel value in the second region as pixel values in respective regions of the overlap region.

An image processing program of the present invention makes a computer execute the above-described image processing method.

A computer-readable recording medium of the present invention stores the above-described image processing program.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 16 illustrates a first example of expansion of the moving object existing region in the overlap region.

FIG. 17 illustrates a second example of expansion of the moving object existing region in the overlap region.

FIG. 20 illustrates examples of two images to be joined together.

DESCRIPTION OF THE PREFERRED EMBODIMENTS

First Embodiment

Figure 1:
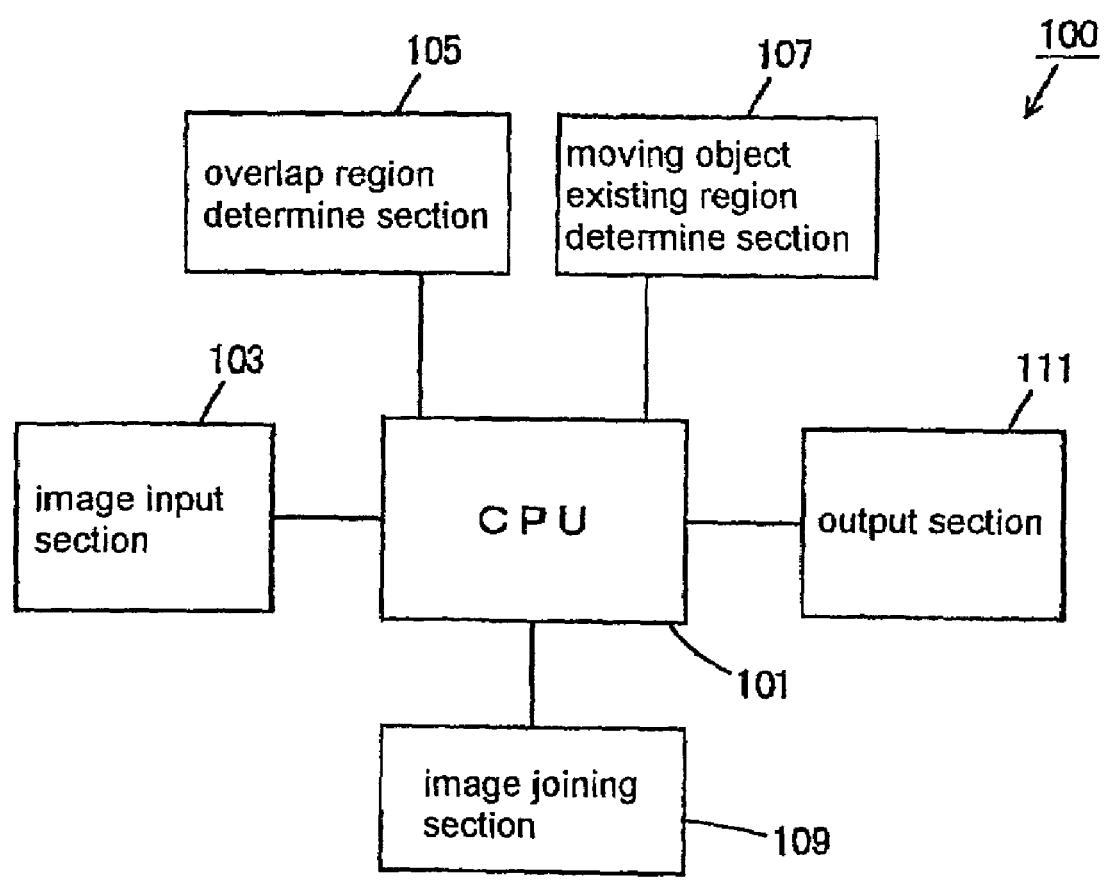
FIG. 1 is a block diagram showing a schematic structure of an image processing apparatus 100 according to the first embodiment of the present invention.

FIG. 1 is a block diagram showing a schematic structure of an image processing apparatus 100 according to a first embodiment of the present invention. The image processing apparatus 100 comprises a CPU (Central Processing Unit) 101 for overall controlling of the apparatus, an image input section 103 for inputting a plurality of captured images, an overlap region determining section 105 for determining an overlap region where adjacent ones of the inputted images overlap with each other, an moving object existing region determining section 107 for determining a region where a moving object exists in the overlap region determined, an image joining section 109 for joining the inputted images by determining a pixel value in the overlap region and a pixel value in a region other than the overlap region, and an output section 111 for outputting the joined image.

The image input section 103 inputs, to the image processing apparatus 100, a plurality of digital images captured by a digital camera for example and including an overlap region where the images partially overlap with each other. The overlap region determining section 105 determines the overlap region between adjacent ones of the plurality of images by performing matching processing for example. The moving object existing region determining section 107 compares the images with respect to the overlap region determined. When there exists a region where the respective pixel values differ greatly due to the existence of a moving object in that region, the region is determined as a moving object existing region.

The image joining section 109 determines pixel values of the image after joining separately for the overlap region and for the region other than the overlap region. In the overlap region, the processing is performed separately for the moving object existing region and for the region other than the moving object existing region, thereby determining pixel values in the respective regions. When all the pixel values after joining are determined, the output section 111 outputs the joined image. Specifically, the joined image may be displayed on a display apparatus such as a CRT, outputted to a printer or the like or outputted to a recording medium as an image file.

Next, the operation of the image processing apparatus 100 will be described using examples. Herein, for convenience of the description, the case where two left and right images are joined together will be described. However, vertical images or three or more images may be joined together. Also in such a case, the same processing as will be described below is performed for the portion where the images are joined together.

Figure 2:
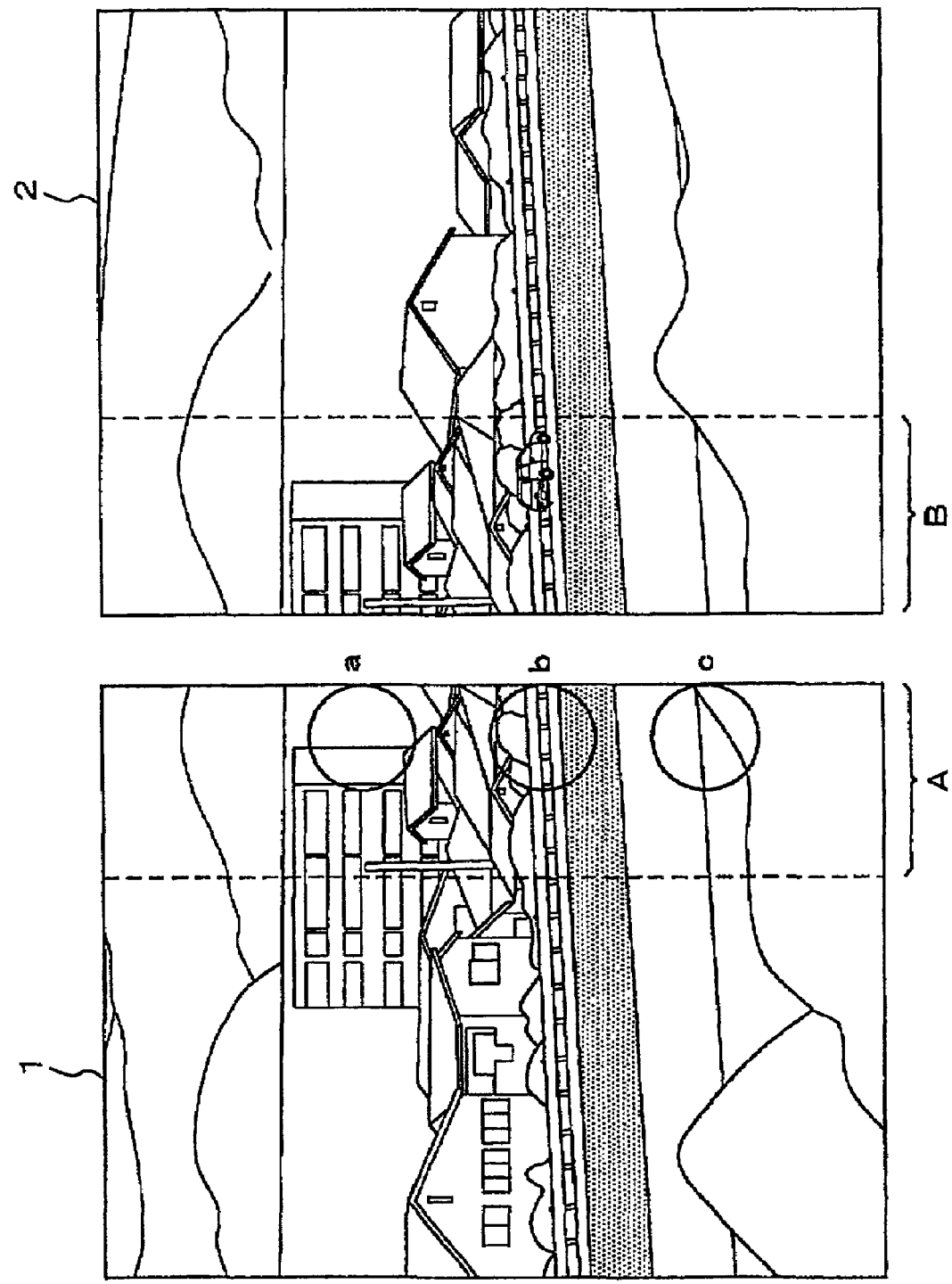
FIG. 2 illustrates examples of two images inputted in the image input section 103 for image joining.

FIG. 2 illustrates examples of two images inputted in the image input section 103 for image joining. As shown in FIG. 2, a left image 1 and a right image 2 are to be joined together. The right side region A of the left image 1 and the left side region B of the right image 2 overlap each other.

When these two images are inputted in the image input section 103, the overlap region determining section 105 determines the overlap region between these two images. Specifically, the two images are registered by local matching of the right side region of the left image and the left side region of the right image. The local matching is performed by associating feature points such as edges or letters extracted from the respective right and left images with each other.

Even when a moving object exists, it is possible to register the images by local matching at the region which does not include the moving object. For example, in performing matching based on the left image 1 of FIG. 2, the correct matching is impossible at the region b of the left image 1, because no moving object exists in the region b whereas a moving objects exists in the region of the right image 2 corresponding to the region b. However, it is possible to match the images with each other at the region a or at the region c. Thus, by averaging a plurality of matching results, it is possible to remove a matching point which is clearly incorrect.

Based on the set of correct matching points of the two images thus obtained, a deformation parameter for superimposing the two images is calculated. Then, with respect to one of the images (the left image 1 for example), the other image (the right image 2 for example) is registered by utilizing the deformation parameter. Thus, the overlap region where the right and left images overlap each other is determined.

When the overlap region is determined, the moving object existing region determining section 107 extracts the moving object existing region included in the overlap region i.e. the region in which a moving object exists.

Figure 3:
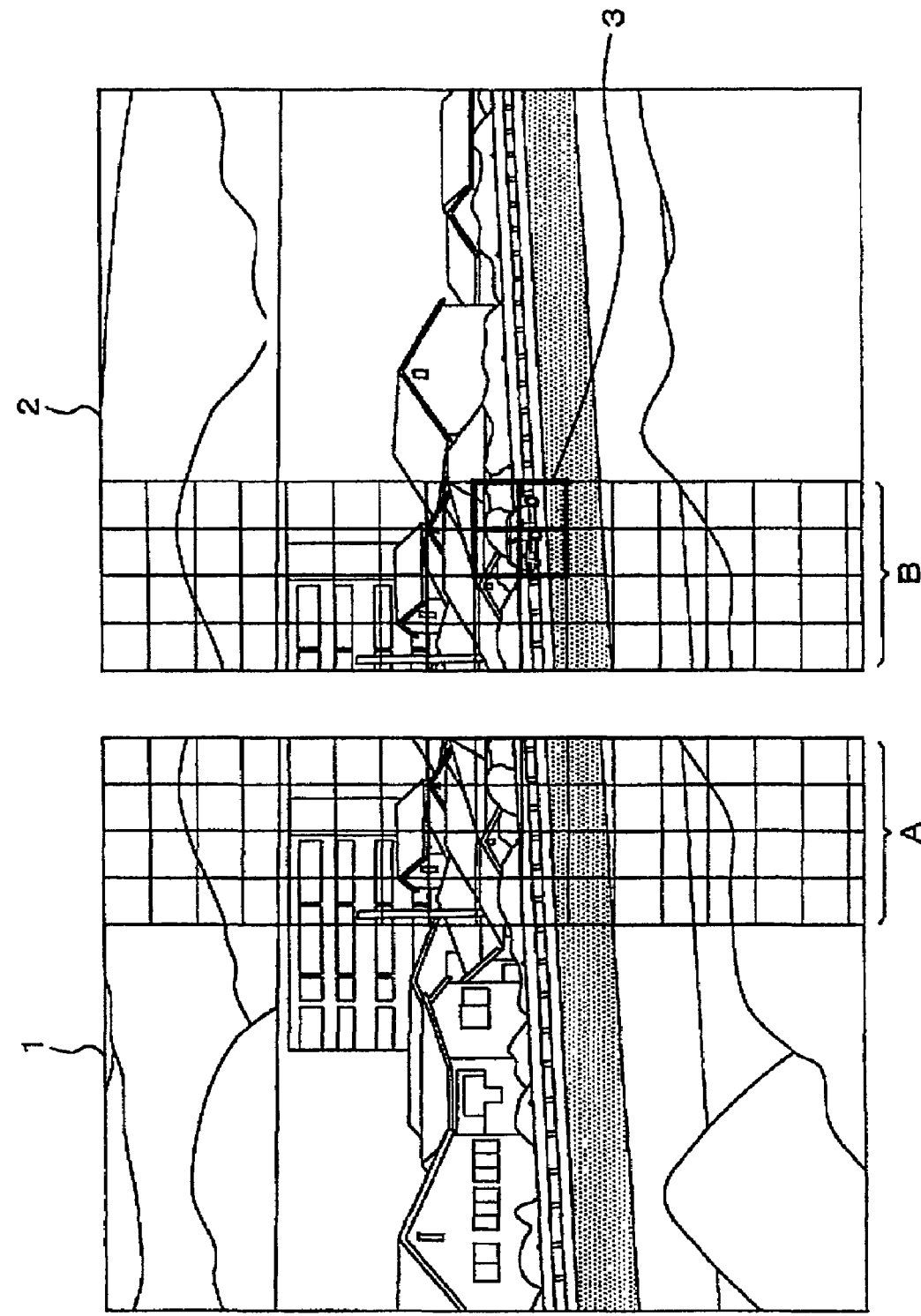
FIG. 3 illustrates the case where the moving object existing region is extracted by dividing the overlap region.

FIG. 3 illustrates the case where a moving object existing region is extracted by dividing the overlap region. As shown in this figure, each of the overlap region A of the left image 1 and the overlap region B of the right image 2 is similarly divided into small regions (blocks). At this time, the overlap region may be divided into the form of simple tiles as shown in this figure or may be divided in accordance with the content of the image by various known techniques for region division or techniques for extracting object.

Subsequently, image matching is performed for each set of corresponding small blocks. Thus, small blocks the content of which differ largely between the two images are extracted and determined as moving object existing regions. The image matching may be performed, for example, by obtaining the sum of absolute values of pixel value differences between the two overlap regions A and B for each of the corresponding sets of small blocks. Specifically, when the absolute value sum is smaller than a predetermined threshold value, the contents of the images in the relevant set of the small blocks are determined to be consistent with each other. When the absolute value sum is equal to or greater than the threshold value, the contents of the images are determined to be inconsistent with each other.

It is to be noted that the method of image matching is not limited to the above-described one. For example, the matching may be performed using respective difference images to lessen the influence of exposure difference between the two images. Further, the matching may be performed after the exposure difference between the left and the right images is corrected by a value obtained by comparing the left and right images with respect to the average of pixel values in the overlap region. Any other method may be employed as long as it is capable of determining consistency or inconsistency of the contents of the images.

As a result of the image matching for each of the small blocks, four small blocks 3 indicated by bold lines are determined as moving object existing regions.

Figure 4:
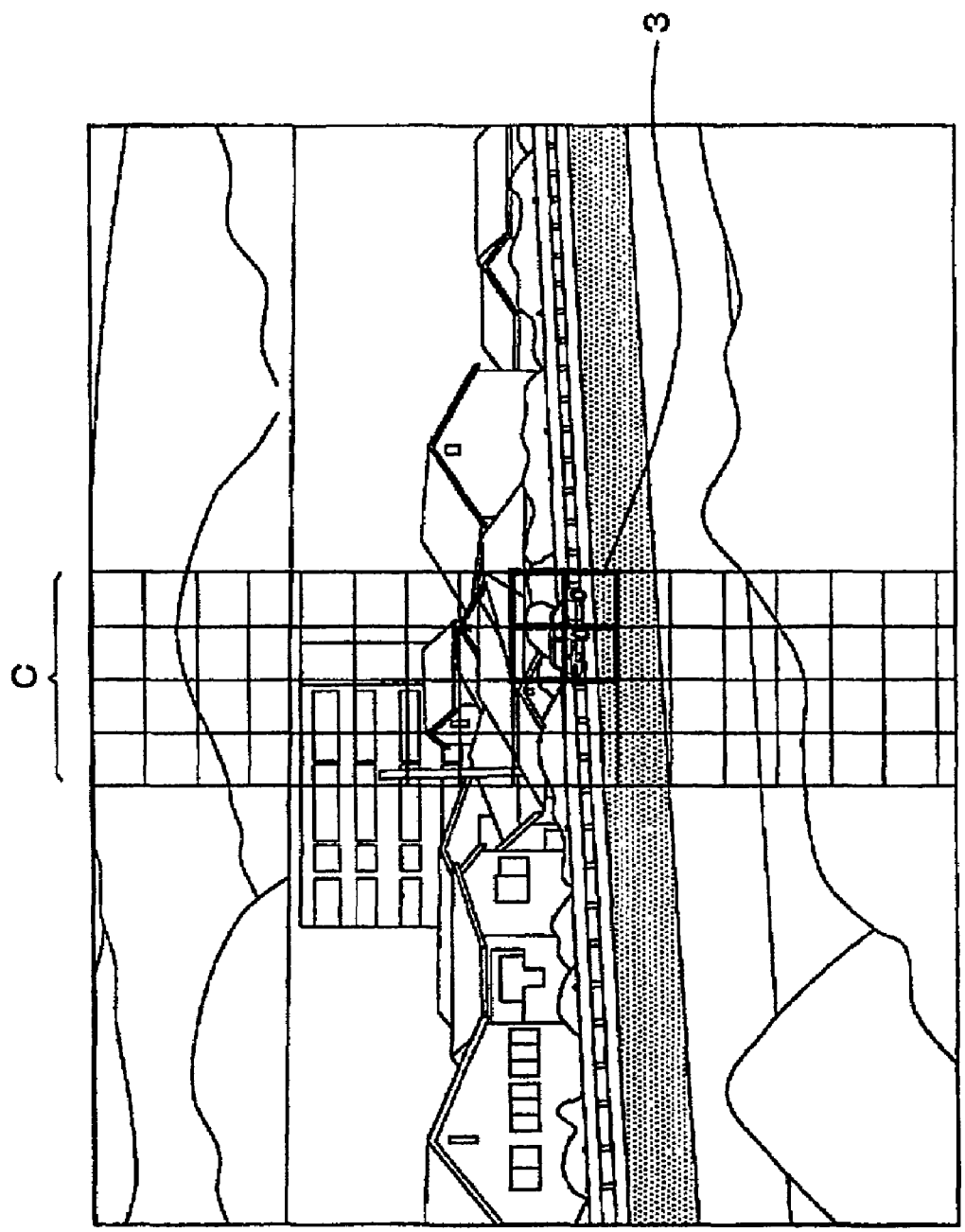
FIG. 4 illustrates a composite image obtained by joining the two images shown in FIG. 2 at the overlap regions A, B.

When the moving object existing region 3 is determined, the image joining section 109 utilizes the result to carry out the processing for joining the right and the left images. FIG. 4 illustrates a composite image obtained by joining the two images shown in FIG. 2 at the overlap regions A, B. In the image joining section 109, each pixel value in the overlap region C and each pixel value in the region other than the overlap region C after the joining are determined and a single joined image (composite image) is formed using the pixel values.

Figure 5:
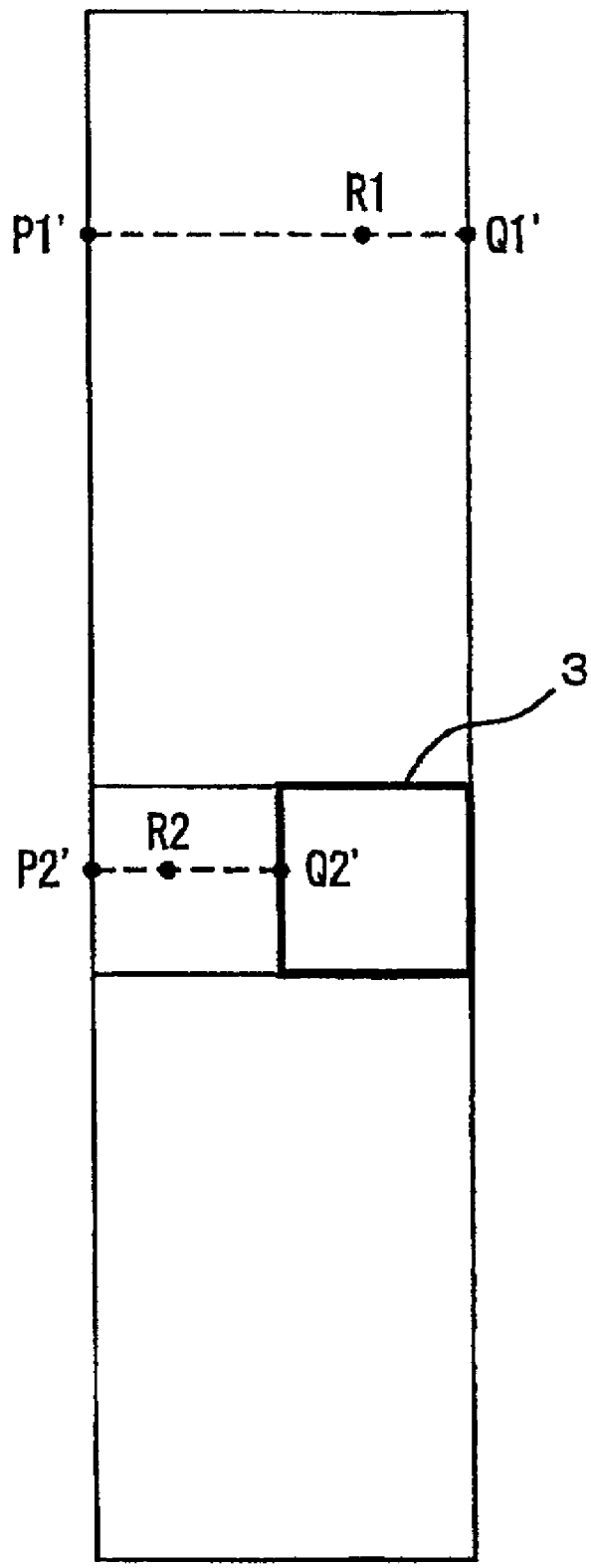
FIG. 5 specifically illustrates the determination of a pixel value in the overlap region C shown in FIG. 4.

FIG. 5 specifically illustrates the determination of a pixel value in the overlap region C shown in FIG. 4. As shown in FIG. 4, the overlap region includes the moving object existing regions 3. With respect to each of the moving object existing region 3, a pixel value at a corresponding position of the right image 2 is utilized as the pixel value after the joining. This is because the moving object existing regions 3 are close to the right edge in the overlap region.

For the remaining regions in the overlap region, each pixel value is determined by weighted mean processing. Now, let V be the pixel value after the image joining. At points such as the point R1 in the overlap region, the pixel value is obtained by weighted mean processing using the length of a straight line P1'Q1'. Specifically, the pixel value V (R1) at the point R1 is found by:

$$V(R1)=(P1'R1\times V2(R1)+Q1'R1\times V1(R1))/(P1'Q1')$$

Further, at point such as the point R2 in the overlap region, weighted mean is obtained using the length of a straight line P2'Q2'. Specifically, the pixel value V(R2) at the point R2 after the image joining is found by:

$$V(R2)=(P2'R2\times V2(R2)+Q2'R2\times V1(R2))/(P2'Q2')$$

Here, V1 (R1), V1 (R2) are pixel values of the left image 1 at positions corresponding to the pixel positions R1, R2, respectively, whereas V2 (R1), V2 (R2) are pixel values of the right image 2 at positions corresponding to the pixel positions R1, R2, respectively.

In this way, in the overlap region, each pixel value in the moving object existing region 3 is determined utilizing a pixel value of one of the images (the right image 2). In other regions, each pixel value is determined utilizing the respective pixel values of the two images by weighted mean processing appropriate for each region.

Next, the image joining processing in the image processing apparatus 100 will be described in detail with reference to FIGS. 6 through 12. However, with respect to the process steps which have been already described, the detailed description thereof will be omitted.

Figure 6:
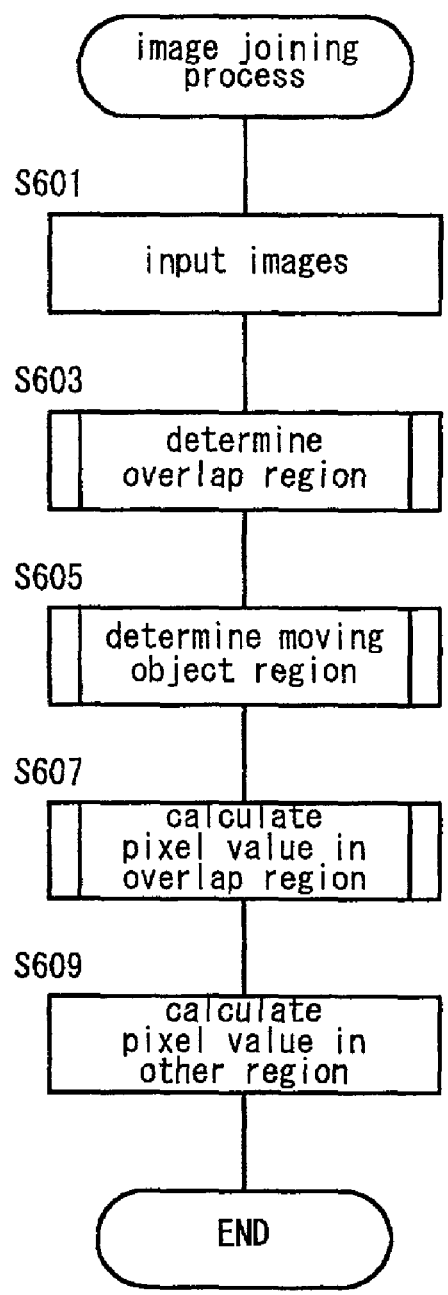
FIG. 6 is a flow chart showing the entire flow of the image joining process in the image processing apparatus 100.

FIG. 6 is a flow chart showing the entire flow of the image joining processing in the image processing apparatus 100. First, as shown in FIG. 6, a plurality of images to be joined are inputted in Step S601. Then, in Step S603, each overlap region of adjacent images of the plural images is determined by local matching processing.

Subsequently, in Step S605, a moving object existing region is determined from each overlap region determined. Then, in Step S607, each pixel value in the overlap region is calculated while taking the moving object existing region into consideration. Finally, in Step S609, each pixel value in regions other than the overlap region is determined. Thus, the image joining processing is completed.

Figure 7:
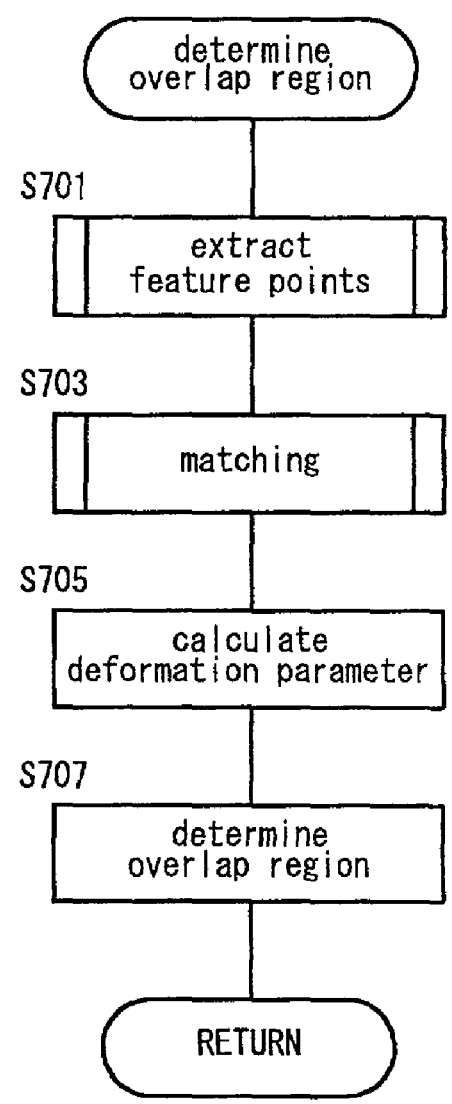
FIG. 7 is a flow chart showing details of the overlap region determining process (Step S603) of FIG. 6.

FIG. 7 is a flow chart showing details of the overlap region determining process (Step S603) of FIG. 6. Referring to FIG. 7, first in Step S701, feature points such as edges or letters are extracted from partial images (images of appropriate regions adjacent the overlap region) of the both images. Then, in step S703, matching processing based on the feature points is performed for registering the both images. Specifically, by associating respective feature points of the both image with each other, a set of accurate pairs of corresponding points is obtained.

When the registration of the both images by the matching processing is completed, a deformation parameter is calculated in Step S705. The deformation parameter herein is a parameter for performing geometric deformation such as rotation, magnification, or translation with respect to one image relative to the other image so that respective corresponding points found out in the matching processing coincide with each other. An example of such parameter is an affine parameter used in affine conversion or the like.

When the deformation parameter is calculated, the both images are registered to determine the overlap region in Step S707.

Figure 8:
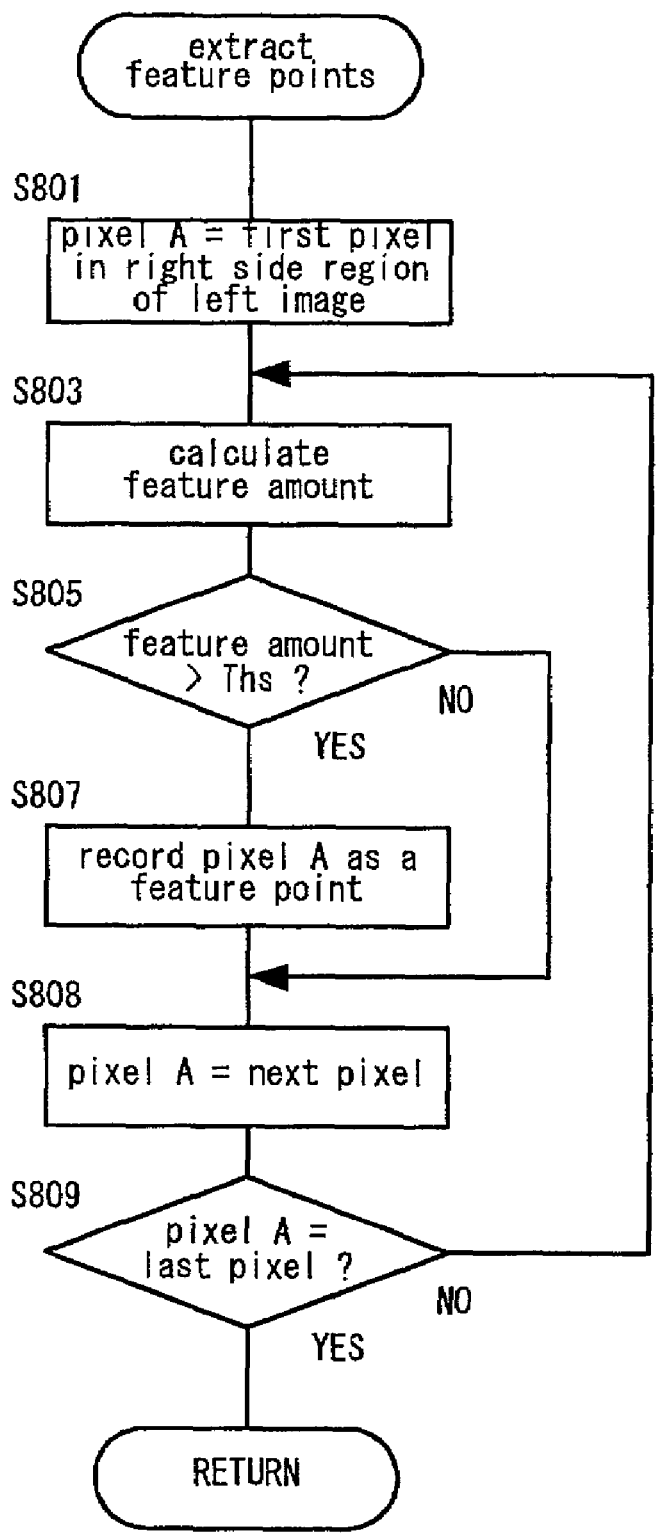
FIG. 8 is a flow chart showing details of the feature point detecting process (Step S701) of FIG. 7.

FIG. 8 is a flow chart showing details of the feature point detecting process (Step S701) of FIG. 7. First, as shown in FIG. 8, a first pixel in a right side region (partial image) of the left image 1 is extracted (Step S801) and the feature amount of the pixel is calculated (Step S803). Any kind of feature amount may be utilized as long as it represents the degree of edge or corner, and an absolute value of quadratic differential may be considered for example.

In the case where the calculated feature amount is greater than a threshold value Ths ("YES" in Step S805), the pixel is recorded as a feature point (Step S807) and the next pixel is extracted (Step S808). On the other hand, in the case where the calculated feature amount is equal to or smaller than the threshold value, Step S807 is skipped to extract the next pixel (Step S808).

When the next pixel is extracted, whether or not the pixel is the last pixel in the right side region of the left image 1 is determined (Step S809). If the pixel is not the last pixel, the process returns to Step S803 to repeat the same process steps (Step S803 through Step S809). If the pixel is the last pixel ("YES" in Step S809), the feature point detecting process is finished, and the pixel recorded in Step S807 become the feature point.

Figure 9:
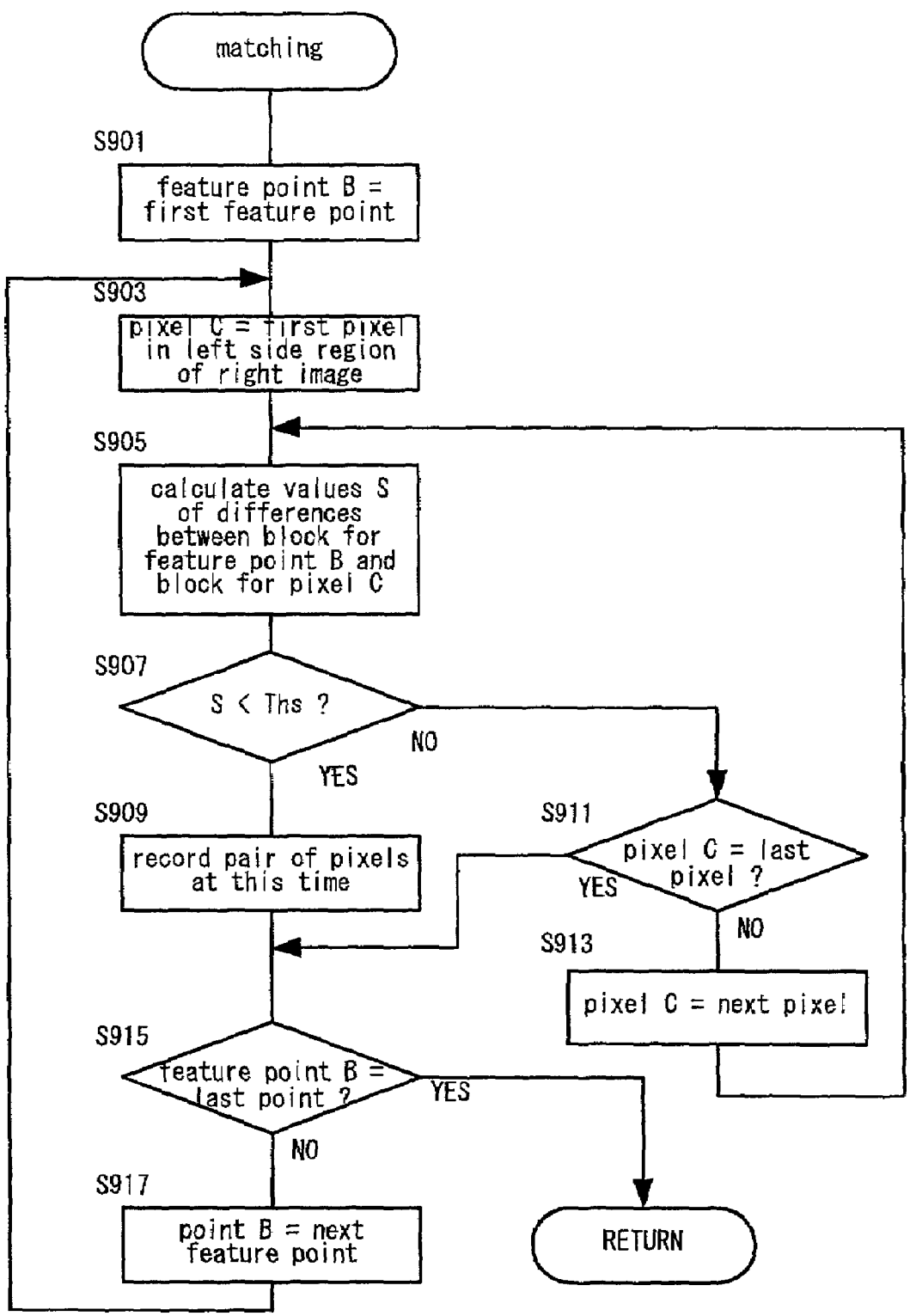
FIG. 9 is a flow chart showing details of the matching processing (Step S703) of FIG. 7.

FIG. 9 is a flow chart showing details of the matching processing (Step S703) of FIG. 7. Referring to FIG. 9, a first feature point B of the left image 1 is extracted (Step S901), and a first pixel C of a left side region (partial image) of the right image 2 is extracted (Step S903). Then, the sum of absolute values S of the pixel value differences between the block for the feature point B and the block for the pixel C is calculated (Step S905).

Figure 10A:
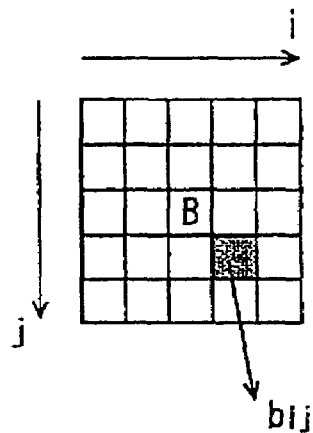
FIGS. 10A and 10B are figures for describing the calculation of the absolute value sum S in Step S905.
Figure 10B:
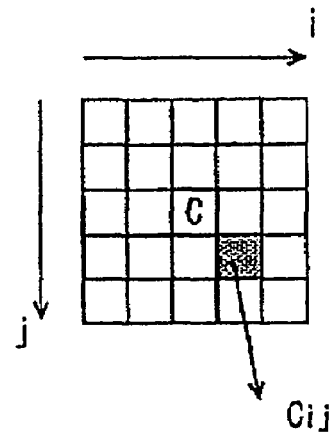

FIGS. 10A and 10B are figures for describing the calculation of the absolute value sum S in Step S905. FIG. 10A illustrates the block for the feature point B, whereas FIG. 10B illustrates the block for the pixel C. In this case, a 5×5 block with the feature point B located at the center and a 5×5 block with the feature point C located at the center are used. Therefore, the sum S of absolute values of the pixel value differences between the blocks is found by:

$$S=\Sigma|b_{ij}-c_{ij}|, (i, j=0\sim4)$$

Returning to FIG. 9, when the absolute value sum S is calculated, whether or not the sum is smaller than a threshold value Ths is judged (Step S907). When the sum S is smaller than the threshold value Ths, the two pixels (the feature point B and the pixel C) are judged to match each other, and the pair of pixels at this time is recorded (Step S909). Then, whether or not the feature point is the last feature point is judged (Step S915).

On the other hand, when the absolute value sum S is judged to be equal to or greater than the threshold value ("NO" in Step S907), it is judged that the two pixels (the feature point B and the pixel C) do not match with each other and the process proceeds to the step for performing comparison with another pixel. Specifically, whether or not the pixel C is the last pixel in the left side region of the right image 2 is judged (Step S911). If it is not the last pixel, the next pixel is defined as a pixel C (Step S913) and the process returns to Step S905.

Then, when the absolute value sum S is equal to or greater than the threshold value ("NO" in Step S907), the calculation of an absolute value sum S and the comparison of the sum S with the threshold value Ths are repeated until the pixel C becomes the last pixel in the left side region of the right image 2.

In the case where the pixel C is the last pixel in the left side region of the right image 2 ("YES" in Step S911), the process proceeds to Step S915 in which whether or not the feature point B is the last feature point is judged.

In the case where the pixel is not the last feature point ("NO" in Step S915), the next feature point is extracted to be the feature point B, and the process returns to Step S903. Thus, the same process steps (Step S903 through Step S917) are repeated. In the case where the feature point B is the last feature point ("YES" in Step S915), the matching processing is finished.

The local matching processing based on the feature points described above can be carried out more easily and quickly than the matching processing performed for all the pixels.

Figure 11:
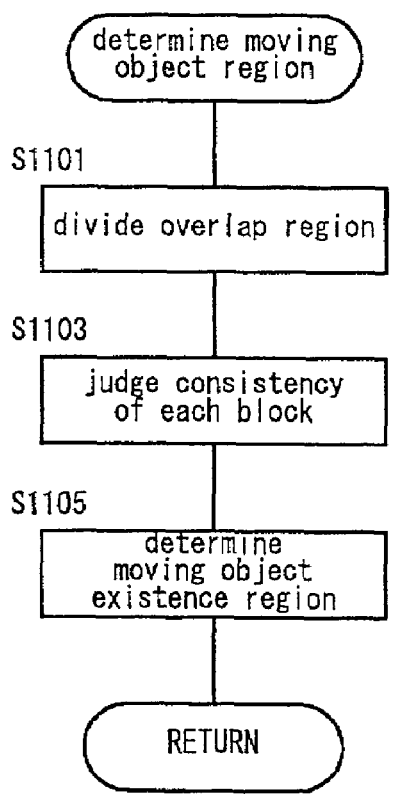
FIG. 11 is a flow chart showing details of the moving object existing region determining process (Step S605) of FIG. 6.

Next, the moving object existing region determining process will be described. FIG. 11 is a flow chart showing details of the moving object existing region determining process (Step S605) of FIG. 6. Referring to this figure, first in step S1101, the overlap region determined is divided into appropriate blocks.

Then, in step S1103, consistency between two images is judged with respect to each block. Specifically, as described above, consistency or inconsistency is judged depending on whether or not the sum of absolute values of pixel value differences in each block is equal to or greater than a threshold value.

When the consistency judging process is completed for all the blocks in the overlap region, the block which is judged to be inconsistent is determined as a moving object existing region (Step S1103). This is because, when judged to be inconsistent, i.e. when the absolute value sum of the pixel value differences in each block is equal to or greater than the threshold value, it is considered that the images differ greatly from each other due to the existence of a moving object. When a moving object existence region is determined in this way, the moving object existing region determining process is finished.

Figure 12:
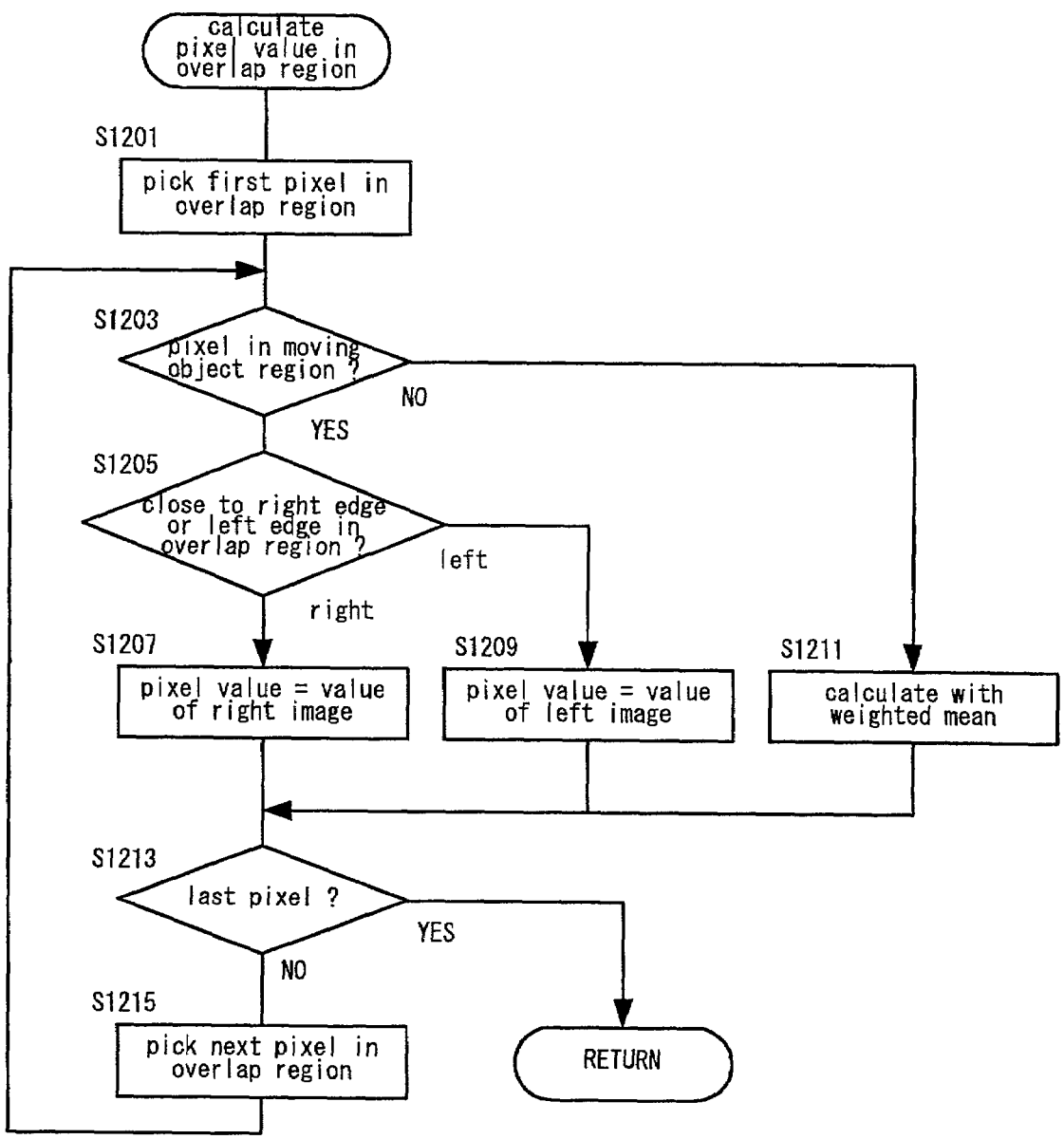
FIG. 12 is a flow chart showing details of the process step for determining pixel values of the overlap region (Step S607) of FIG. 6.

FIG. 12 is a flow chart showing details of the process step for determining pixel values of the overlap region (Step S607) of FIG. 6. As shown in this figure, whether the moving object existing region is close to the right edge or close to the left edge in the overlap region is judged, and a pixel value in the moving object existing region is determined based on the result.

As shown in this figure, first in Step S1201, a first pixel in the overlap region is picked. Then, in Step S1203, it is judged whether or not the picked pixel is a pixel in the moving object existing region. When the pixel is not a pixel in the moving object existing region ("No" in Step S1203), an weighted mean of the respective pixel values of the both images in the overlap region is calculated in Step 1211, and the value obtained is determined as the pixel value after the image joining.

On the other hand, when it is judged, in Step S1203, that the pixel picked is within the moving object existing region ("YES" in Step 1203), whether the moving object existing region is close to the right edge or close to the left edge in the overlap region is judged in Step S1205.

When it is judged that the region is close to the right edge, the pixel value of the corresponding pixel position in the right image 2 is utilized as the pixel value after the image joining in Step S1207. When it is judged that the region is close to the left edge, the pixel value of the corresponding pixel position in the left image 1 is utilized as the pixel value after the image joining in Step S1209.

In this way, a pixel value in the region other than the moving object existing region is determined by typical weighted mean processing, whereas a pixel value in the moving object existing region is determined using a pixel value of either one of the right image and the left image.

When a pixel value is determined, whether or not the pixel is the last pixel in the overlap region is judged in Step S1213. When it is not the last pixel ("NO" in Step S1213), the next pixel in the overlap region is picked in Step S1215. Then, the process returns to Step S1203 and the same process steps (Step S1203 through Step S1213) are repeated.

When the pixel value for the last pixel in the overlap region is determined ("YES" in Step S1213), the pixel value determining process for the overlap region is finished.

According to the process described above, in the overlap region, a pixel value in the region which does not include a moving object is determined by the typical weighted mean processing conducted for the pixel values of the two images based on the pixel position. On the other hand, for a pixel value in the moving object existing region, it is judged whether the moving object existing region is close to the right edge or close to the left edge of the overlap region, and based on the result of judgment, the pixel value of either one of the right image and the left image is used as the pixel value for that region.

Since a pixel value of one image is used, a clear image is obtained after the image joining while avoiding such a disadvantage that the moving object in the moving object existing region blurs. Particularly, which image of pixel value is to be used is determined based on whether the moving object existing region is close to the right edge or the left edge of the overlap region. That is, the pixel value of the closer image is selected. Therefore, a natural image with smooth transition to the adjacent image can be provided.

Further, in the region other than the moving object existing region, each pixel value is determined by the weighted means processing. Therefore, the seam at the boundary of the joining becomes inconspicuous.

Figure 13:
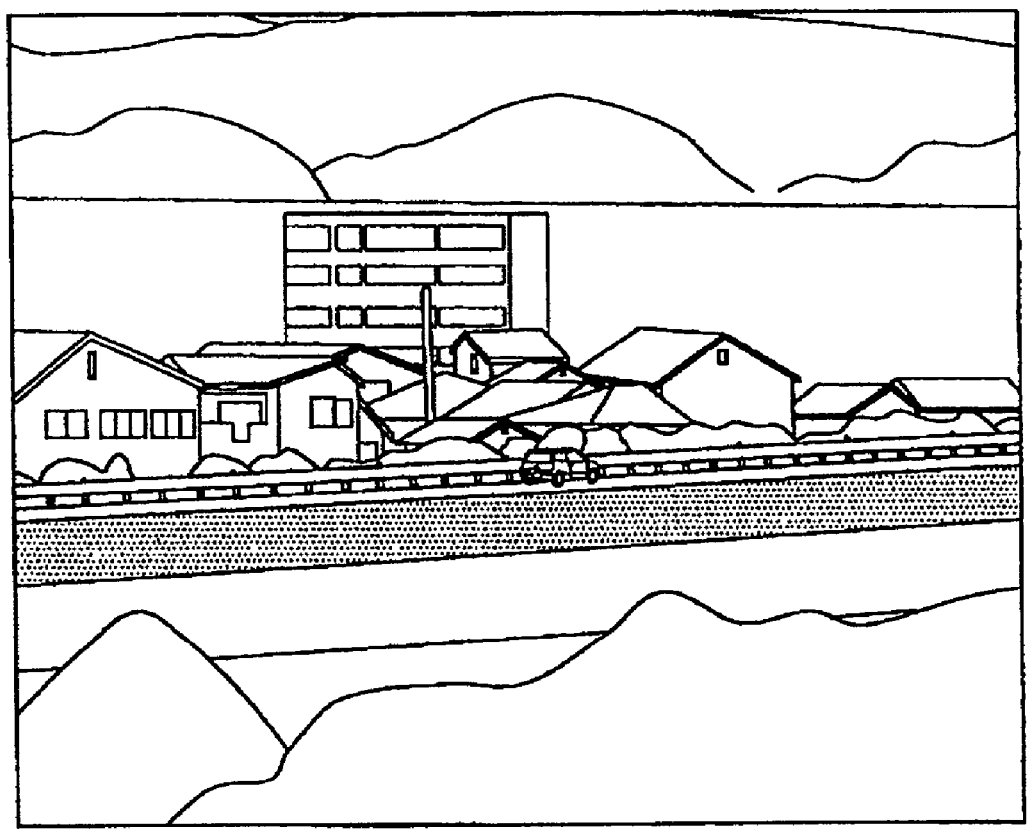
FIG. 13 is a composite image obtained by joining the two images shown in FIG. 2 by the image processing apparatus 100 according to this embodiment.
Figure 14:
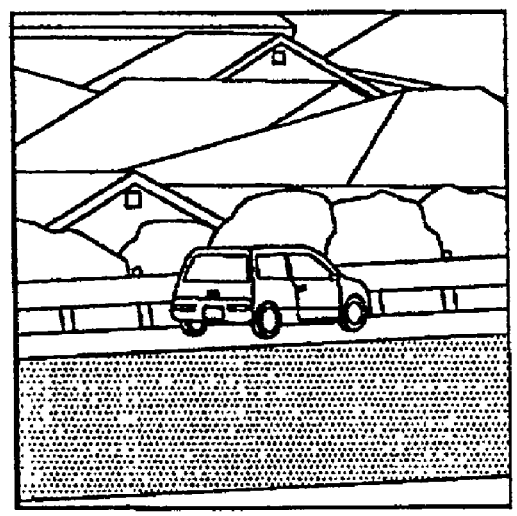
FIG. 14 is an enlarged view of the moving object existing region of the image shown in FIG. 13.

FIG. 13 is a composite image obtained by joining the two images shown in FIG. 2 by the image processing apparatus 100 according to this embodiment. FIG. 14 is an enlarged view of the moving object existing region of the image shown in FIG. 13. As shown in FIGS. 13 and 14, in the composite image, the moving object, which was included only in one of the two images of FIG. 2, clearly appears without blurring. Further, the seam of the joined image is not conspicuous.

Modification

Next, a modification in the embodiment of the present invention will be described. As described with reference to FIGS. 3 and 5, in the image processing apparatus 100 of the first embodiment, only a block in the overlap region where the contents of two images differ largely is determined as a moving object existing region 3. However, the present invention is not limited to such a case, and the moving object existing region 3 may be expanded to other portions in the overlap region. Hereinafter, when the term "moving object existing region" is used, it refers to the only block where the content of the images differ largely in some cases and refers to the region which also includes an expanded region in other cases.

Figure 15:
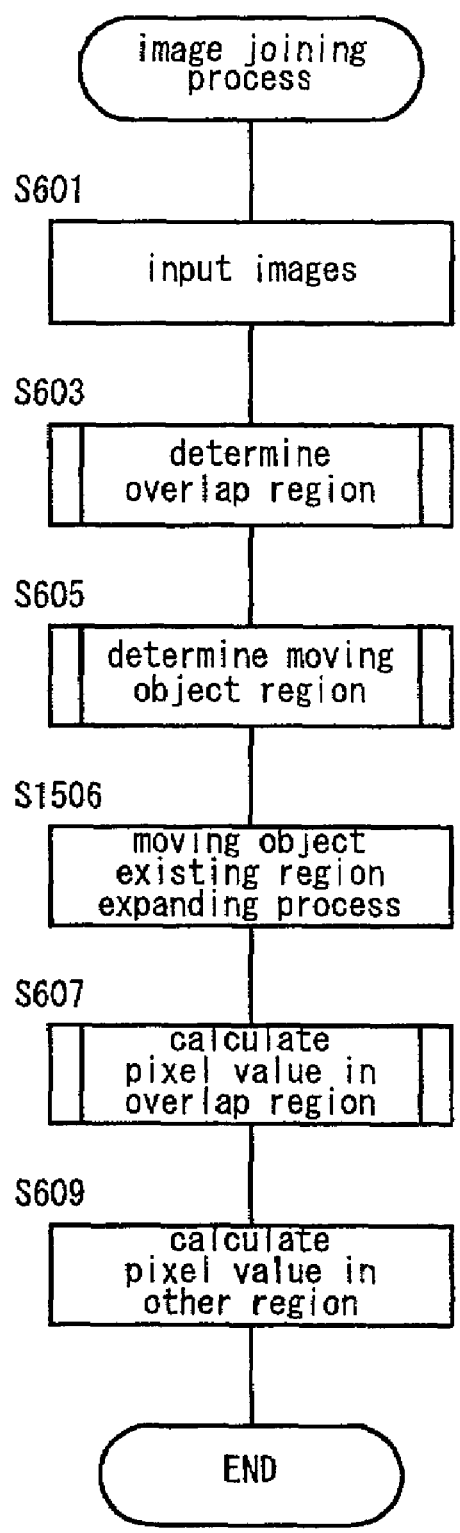
FIG. 15 is a flow chart showing the image joining processing according to this modification of the present invention.

FIG. 15 is a flow chart showing the image joining processing according to this modification of the embodiment. Unlike the flow chart shown in FIG. 6, a moving object existing region expanding process (Step S1506) is additionally included in this process. Other process steps are the same as those of the flow chart shown in FIG. 6.

Specifically, similarly to FIG. 6, a plurality of images are inputted (Step S601), and an overlap region is determined by local matching between partial images of the adjacent images (Step S603). Then, from the overlap region, a moving object existing region where the values of the images differ largely is determined (Step S605).

After the moving object existing region is determined in this way, the expanding of the moving object existing region is carried out in Step S1506. The expanded region will be described later in detail.

When the moving object existing region is expanded in this way, the image joining at the overlap region is performed (Step S607). Thereafter, the image joining for the regions other than the overlap region is performed (Step S609).

It is to be noted that, in the image joining process for the overlap region in step S607, pixel values to be used differ between the expanded moving object existing region and other regions in the overlap region. Thus, the image joining is completed.

Next, referring to FIGS. 16 through 18, examples of expanding the moving object existing region will be described. FIG. 16 illustrates a first example of expansion of the moving object existing region in the overlap region. In the first example, the moving object existing region is expanded to provide expanded regions 13 located above and below the moving object existing region 3. This is effective in making the boundary between the moving object existing region 3 and other portions in the vertical direction inconspicuous.

In this case, for the pixel of the point R3 for example, weighted mean processing is performed utilizing the length of the straight line P3'Q3'. Specifically, the pixel value V(R3) at the point R3 is found by:

$$V(R3)=(P3'R3 \times V2(R3)+Q3'R3 \times V1(R3))/(P3'Q3')$$

where V1 (R3) and V2 (R3) are pixel values of the left image 1 and the right image 2, respectively, at the position corresponding to the pixel position R3.

It is to be noted that pixel values for other regions are obtained in the same manner as that shown in FIG. 5.

FIG. 17 illustrates a second example of expansion of the moving object existing region in the overlap region. As shown in this figure, the moving object existing region 3 is expanded to provide expanded regions 14 indicated by slant lines and these regions are also determined as the moving object existing region. In this way, by expanding the moving object existing region in a simple manner, the processing speed can be increased. Further, of course, it is possible to make the boundary in the vertical direction inconspicuous.

In this case, the pixel at the point R4 is obtained by weighted mean processing utilizing the length of the line P4'Q4'.

Figure 18:
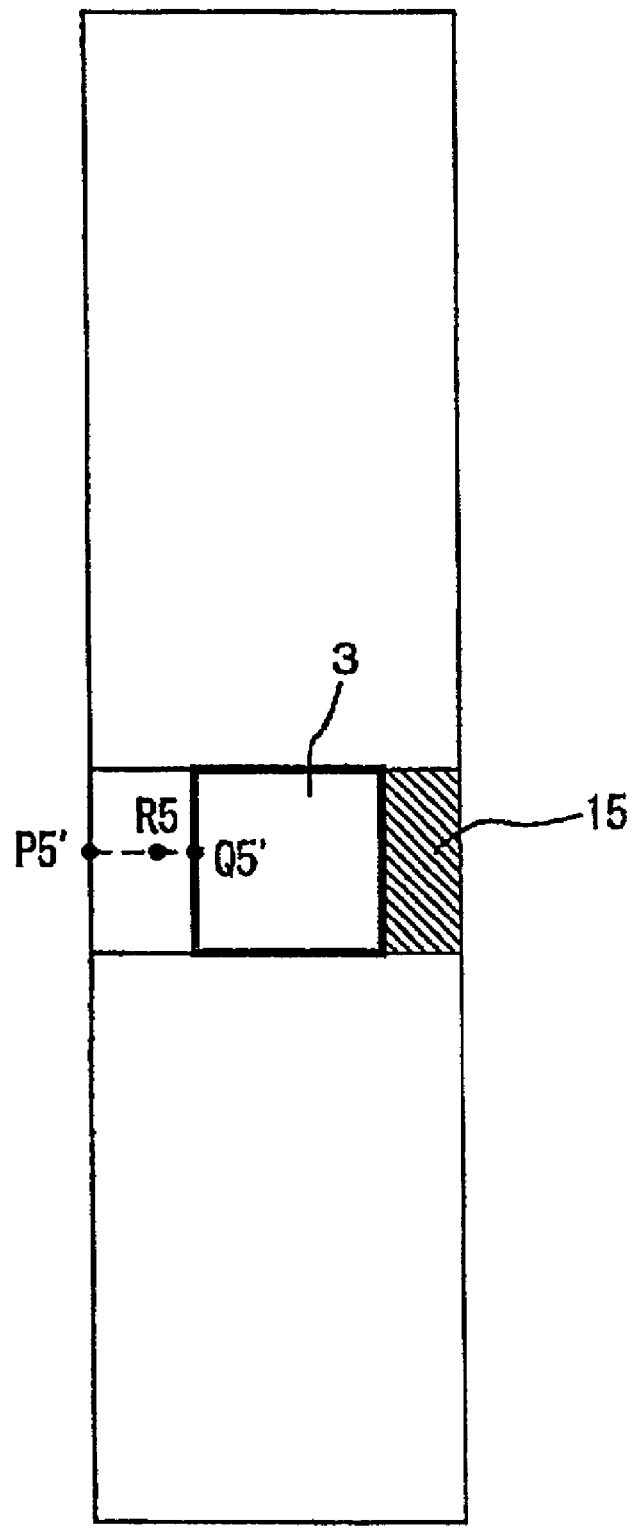
FIG. 18 illustrates a third example of expansion of the moving object existing region in the overlap region.

FIG. 18 illustrates a third example of expansion of the moving object existing region in the overlap region. In this example, the moving object existing region 3 is located as spaced inwardly from opposite edges of the overlap region. In this case, the moving object existing region is expanded to include a region 15 located between the moving object existing region 3 and one of the edges which is closer to the moving object existing region than the other edge.

Therefore, the pixel value at the point R5 is obtained by weighted mean processing utilizing the length of the line P5'Q5'. Therefore, for the pixel value in the expanded region 15, a pixel value of the image on the closer edge side is used, so that a natural image can be obtained.

Second Embodiment

Finally, an image processing apparatus 200 according to a second embodiment of the present invention will be described. The image processing apparatus 200 of this embodiment is identical in overall structure to the image processing apparatus 100 of the first embodiment shown in FIG. 1. Further, the flow of the image joining processing is the same as that shown in the flow chart of FIG. 6. In this embodiment, however, the content of the step for determining pixel values of the overlap region (Step S607) is slightly different.

Figure 19:
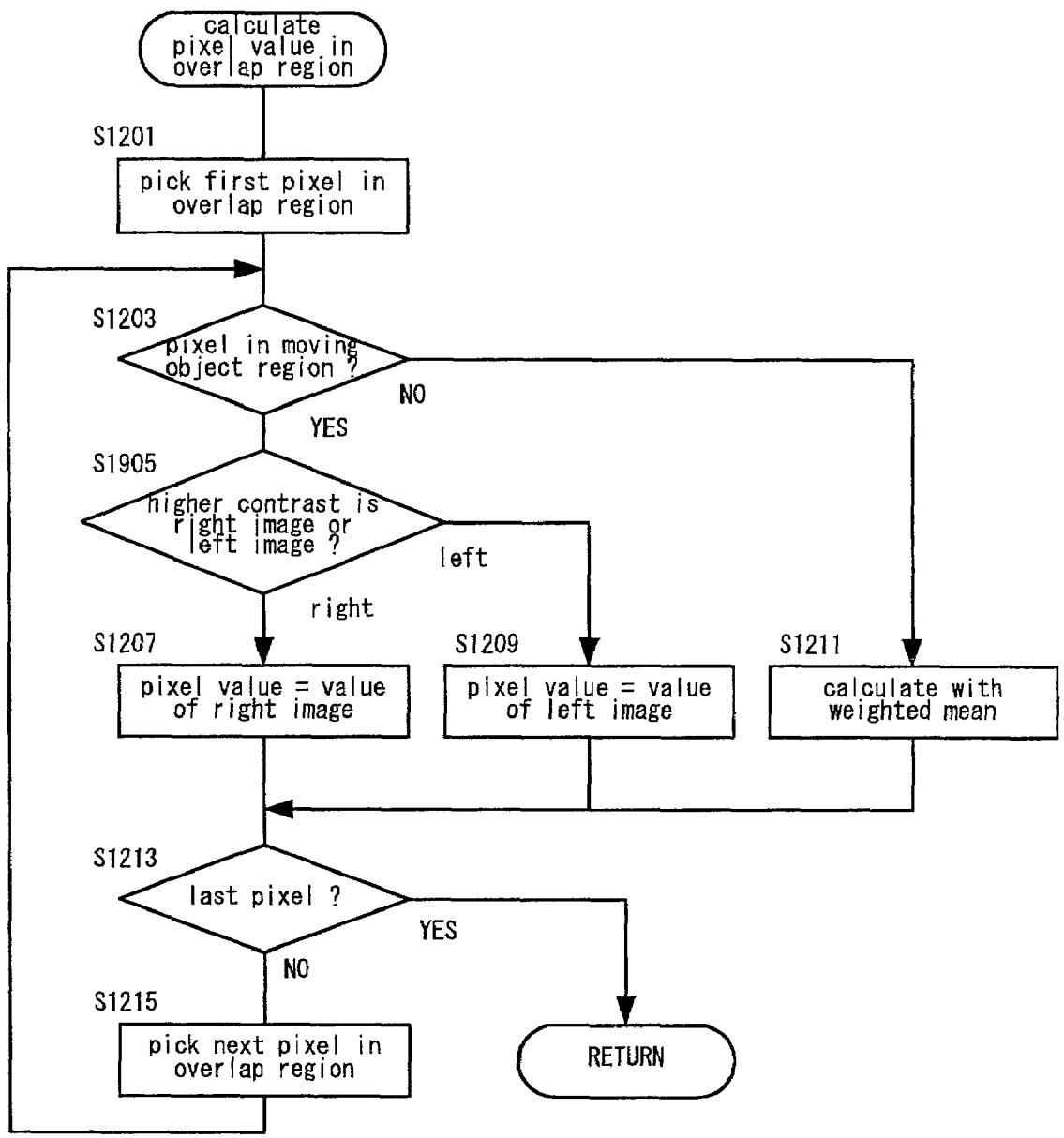
FIG. 19 is a flow chart showing details of the process step for determining pixel values of the overlap region (Step S607 of FIG. 6) in the image processing apparatus 200 according to the second embodiment of the present invention.
Figure 21:
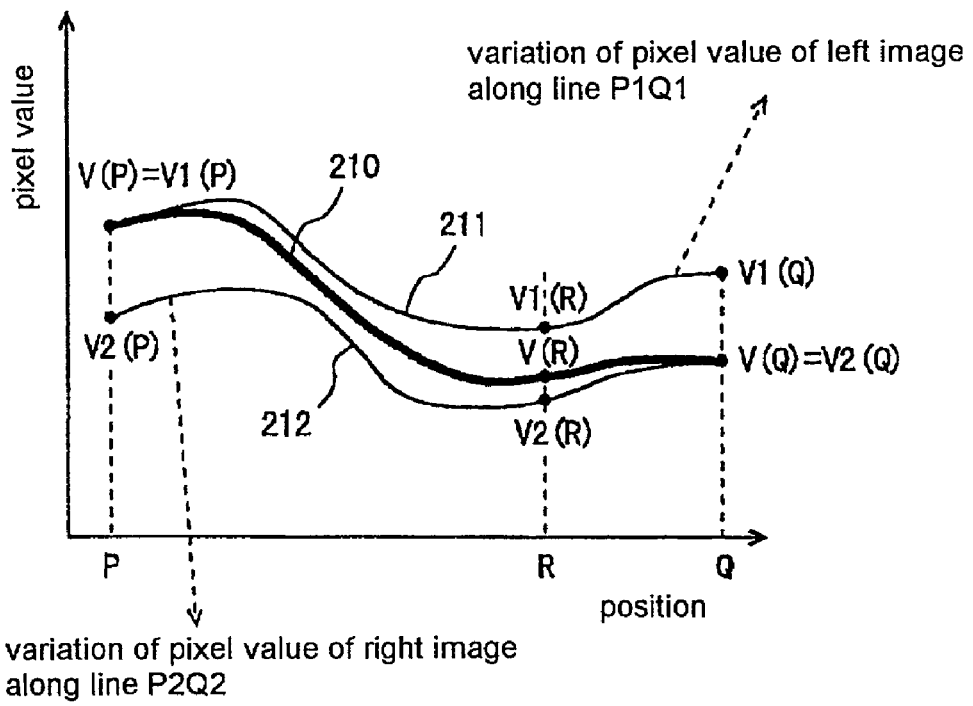
FIG. 21 illustrates the principle of weighted mean processing.
Figure 22:
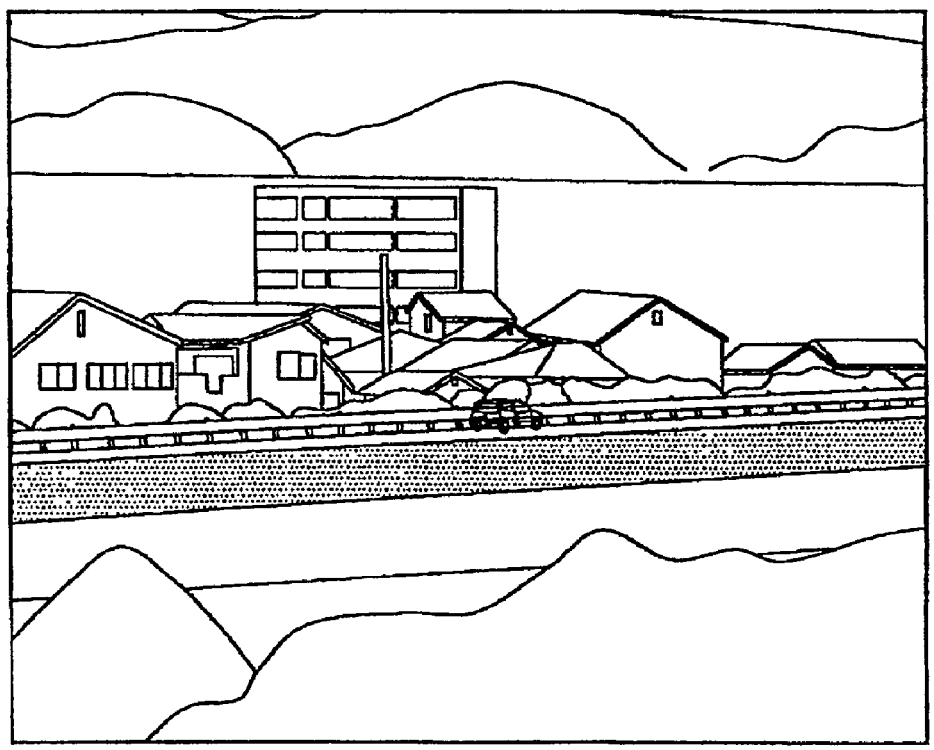
FIG. 22 shows a composite image obtained by joining the two images shown in FIG. 20 using weighted mean processing.
Figure 23:
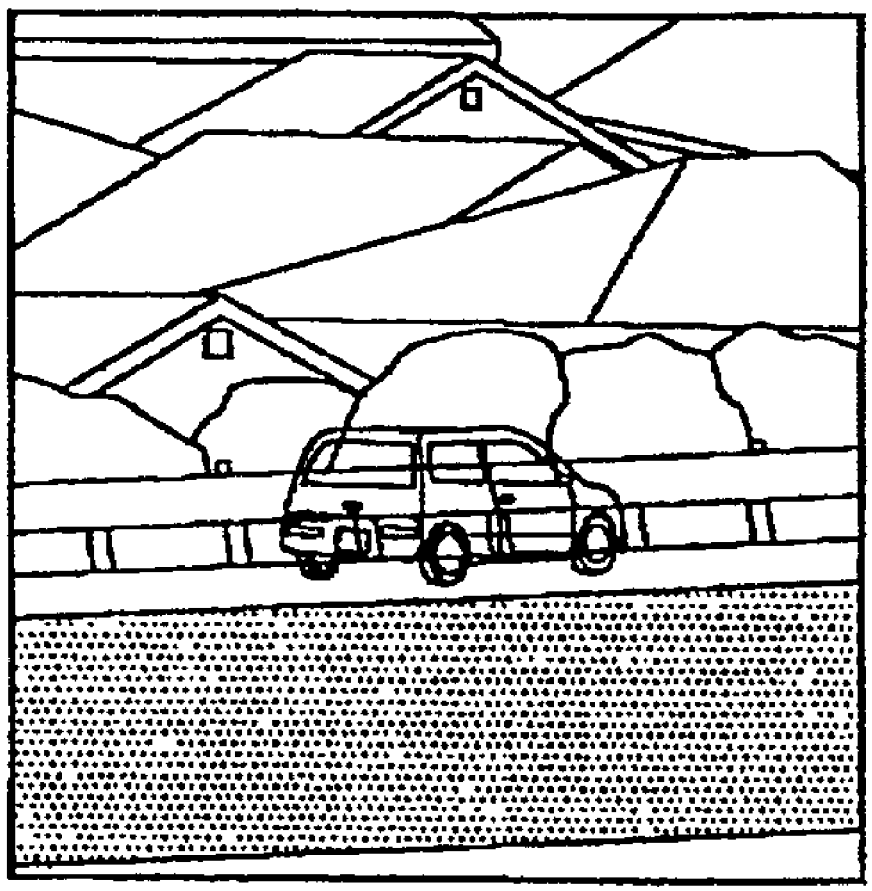
FIG. 23 illustrates the moving object existing region in the composite image of FIG. 22 as enlarged.

FIG. 19 is a flow chart showing details of the process step for determining pixel values of the overlap region (Step S607 of FIG. 6) in the image processing apparatus 200 according to the second embodiment of the present invention. Although this flow chart is generally identical to the flow chart of FIG. 12, the criterion for determining which image of pixel value is to be used for the moving object existing region. Specifically, in this figure, instead of Step S1205 of FIG. 12, Step S1905 is provided. Only the difference will be described below.

When the pixel in the overlap region is a pixel in the moving object existing region ("Yes" in Step S1203), it is judged, in Step S1905, which of the right and the left images has a higher contrast at the moving object existing region. Thus, a pixel value of the image which is judged to have a higher contrast is used as the pixel value for that position. Therefore, with respect to the moving object existing region of the two images shown in FIG. 2 for example, the pixel value of the right image 2 is determined as the pixel value of that position. Therefore, the moving object, or the car clearly appears in the joined image.

Generally, when a background and an object in front of a background are compared, the background has a lower image contrast. By utilizing this, to make a moving object such as an entering object appear clearly, a pixel value of an image of a higher contrast is used. Conversely, to make a moving object disappear, a pixel value of an image of a lower contrast is used.

In this way, how and in which image the moving object exists is judged based on the contrast in the moving object existing region. Then, by determining which one of the higher contrast image and the lower contrast image is to be used, it is possible to easily obtain a clear image in which the moving object clearly appears or a clear image with the moving object disappeared.

In the case where the moving object existing region is expanded as shown in FIGS. 16 through 18, whether or not a pixel is within the moving object existing region is judged with respect to the expanded moving object existing region in Step S1203 of FIG. 19. However, in Step S1905, the comparison of the contrast is carried out only with respect to the initially determined moving object existing region before expansion. In this embodiment, in which image the moving object exists is judged by comparison of the contrast. However, information other than the contrast may be utilized if only the information enables such judgment.

The image processing method for joining images disclosed herein may be realized by a program for carrying out the above-described series of process steps. Such an image processing program may be installed in advance in a hard disk of a computer, or may be recorded in a removable recording medium such as a CD-ROM or a magnetic tape. In any case, the image processing program is recorded in a computer-readable recording medium.

The computer-readable recording medium may be of a tape type such as a magnetic tape or a cassette, a disk type such as a magnetic disk (flexible disk or hard disk device or the like) or an optical disk (CD-ROM, MO, MD, DVD or the like), a card type such as an IC card (including memory card) and an optical card, or a recording medium for fixedly carrying the program such as a semiconductor memory such as a Mask ROM, an EPROM, an EEPROM, or a flash ROM.

It is to be noted that the method may be stored in a recording medium not in the form of a program but in the form of data.

The above-described program may be stored in an image inputting apparatus such as a digital camera or a scanner for joining images in capturing the images, and the result may be recorded in a recording medium.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modification and substitutions of parts and elements as fall within the spirit and scope of the invention.

What is claimed is:

1. An image processing apparatus comprising:
an image input section which inputs two adjacent images, wherein the images partially overlap with each other;
an overlap region determining section which determines an overlap region of the images;
a region determining section which determines first and second regions within the overlap region based on differences in pixel values between the two images;
a first pixel value determining section which determines a pixel value in the first region based on a pixel value of only one of the two adjacent images;
a second pixel value determining section which determines a pixel value in the second region within the overlap region based on respective pixel values of the two adjacent images, wherein the second region is a region of the overlap region other than the first region; and
an image joining section which joins the two adjacent images with each other by utilizing the determined pixel values in the first region and the determined pixel values in the second region as pixel values in respective regions of the overlap region.

2. An image processing apparatus according to claim 1, wherein said first region determining section includes dividing means for dividing the overlap region into predetermined blocks, and comparing means for comparing the two images with respect to pixel values of the predetermined blocks, the first region being determined based on the result of the comparison by the comparing means.

3. An image processing apparatus according to claim 2, wherein said comparing means includes judging means for judging whether or not the sum of absolute values of pixel value differences obtained on a predetermined block basis between the two images is equal to or greater than a threshold value.

4. An image processing apparatus according to claim 3, when said sum is judged to be equal to or greater than the threshold value by the judging means, said first region determining section determines the relevant block as the first region.

5. An image processing apparatus according to claim 3, when said sum is judged to be smaller than the threshold value by the judging means, said first region determining section determines the relevant region as the first region if the relevant region meets a predetermined condition.

6. An image processing apparatus according to claim 1, wherein said second pixel value determining section determines a pixel value by weighted mean processing related with a position.

7. An image processing apparatus according to claim 1, wherein said first pixel value determining section includes judging means for judging which one of the two adjacent images is close to the determined first region when images are joined with each other, the image which is judged to be closer being utilized as one of the images, the pixel value in the first region being determined based on the pixel value of the one image.

8. An image processing apparatus according to claim 1, wherein said first pixel value determining section includes contrast comparing means for comparing the two adjacent images with respect to a contrast of pixels in the determined first region, one of the images being determined based on the result of comparison by the contrast comparing means, the pixel value in the first region being determined based on the pixel value of the one image.

9. An image processing method comprising the steps of:
capturing a plurality of images, adjacent ones of which partially overlap with each other;
determining an overlap region where two adjacent ones of the captured images overlap with each other;
determining first and second regions within the determined overlap region based on whether a difference between corresponding pixels in the two adjacent images exceeds a threshold level;
determining all pixel values in a region of a joined image corresponding to the first region based on a pixel value of only one of the two adjacent images;
determining all pixel values in a region of the joined image corresponding to the second region within the overlap region based on respective pixel values of both of the two adjacent images, the second region being a region of the overlap region other than the first region; and
joining the two adjacent images with each other by utilizing the determined pixel values as pixel values in respective regions of the joined image.

10. A computer readable medium storing an image processing method comprising the steps of:
capturing a plurality of images, adjacent ones of which partially overlap with each other;
determining an overlap region where two adjacent ones of the captured images overlap with each other;
determining first and second regions within the overlap region based on whether a difference between corresponding pixels in the two adjacent images exceeds a threshold level;
determining all pixel values in a region of an joined image corresponding to the first region based on a pixel value of one of the two adjacent images;
determining all pixel values in a region of the joined image corresponding to the second region within the overlap region based on respective pixel values of both of the two adjacent images, the second region being a region of the overlap region other than the first region; and
joining the two adjacent images with each other by utilizing the determined pixel values as pixel values in respective regions of the joined image.

11. A method for joining first and second overlapping images to form a composite image, the method comprising:
determining a region in which the images overlap;
comparing, within the region of overlap, predetermined blocks of pixels in the first image with corresponding predetermined blocks of pixels in the second image to determine if a pixel value of the corresponding blocks of pixels differs by a threshold amount;
identifying the predetermined blocks of pixels as belonging to a first region of pixels or a second region of pixels based on the comparison;
constructing the composite image from the pixels of the first and second images, wherein pixels from corresponding positions in the first and second images are used in portions of the composite image where the first and second images do not overlap, pixels from corresponding positions in the first image are used in portions of the composite image corresponding to the first region of pixels, and pixels calculated from pixels in corresponding positions in both the first and second images are used in portions of the composite image corresponding to the second region of pixels.

12. The method of claim 11 wherein comparing predetermined blocks of pixels comprises determining whether the sum, over all the pixels in a predetermined block, of the absolute value of the difference between corresponding pixels in the first and second image exceeds a threshold value.

13. The method of claim 12 wherein identifying the predetermined blocks comprises identifying pixels in a predetermined block as belonging to a first region of pixels if the sum exceeds the threshold value.

* * * * *